United States Patent

[11] 3,547,229

[72] Inventors Hans Pollinger
Rainfarnstr. 65, 8 Munich 45;
Lawrence J. Lunghamer, Roseggerstr. 14,
8013 Haar, Germany
[21] Appl. No. 776,147
[22] Filed Nov. 15, 1968
[45] Patented Dec. 15, 1970
[32] Priority Dec. 2, 1967
[33] Germany
[31] No. 1,625,755

[54] DISK BRAKE FOR RAILWAY VEHICLES
9 Claims, 7 Drawing Figs.
[52] U.S. Cl. ............................................. 188/59,
188/73, 188/106, 188/196
[51] Int. Cl. ....................................... B61h 5/00;
F16d 65/14, F16d 65/52
[50] Field of Search ..................................... 188/59,
72W, 73, 73C, 196RR, PRR, 106F, 79.5GE

[56] References Cited
UNITED STATES PATENTS
2,184,683  12/1939  Shuman .................. 188/79.5(GE)
3,034,599  5/1962   Gaenssle .................. 188/59
3,194,349  7/1965   Kershner et al. ............ 188/73
3,237,724  3/1966   Kershner et al. ............ 188/106(F)X
3,334,707  8/1967   Eaton ....................... 188/73
3,349,874  10/1967  Stacy et al. ................ 188/59X FOREIGN PATENTS
799,577  8/1958  Great Britain ............ 188/73

Primary Examiner—George E. A. Halvosa
Attorney—Edmund M. Jaskiewicz

ABSTRACT: A U-shaped yoke straddles the peripheral edge of a brake disc with one leg of the yoke carrying a brake shoe on its inner face while in the other leg there is slidably mounted a rod which is movable axially toward and away from the brake disc. The end of the rod adjacent the brake disc is provided with a brake shoe and the other end of the rod has an inclined surface which is parallel to a second inclined surface on a wedge member carried on the end of a piston rod extending from a brake actuating cylinder mounted on the yoke. Roller means are interposed between the parallel inclined surfaces so that actuation of the brake cylinder piston rod is translated into axial movement of the brake shoe rod to apply the brake shoe into frictional engagement with the brake disc. The rod is provided with an automatically operable arrangement to compensate for brake shoe wear.

PATENTED DEC 15 1970 3,547,229

INVENTORS
HANS POLLINGER
LAWRENCE J. LUNGHAMER

Edmund M Jaskiewicz
ATTORNEY

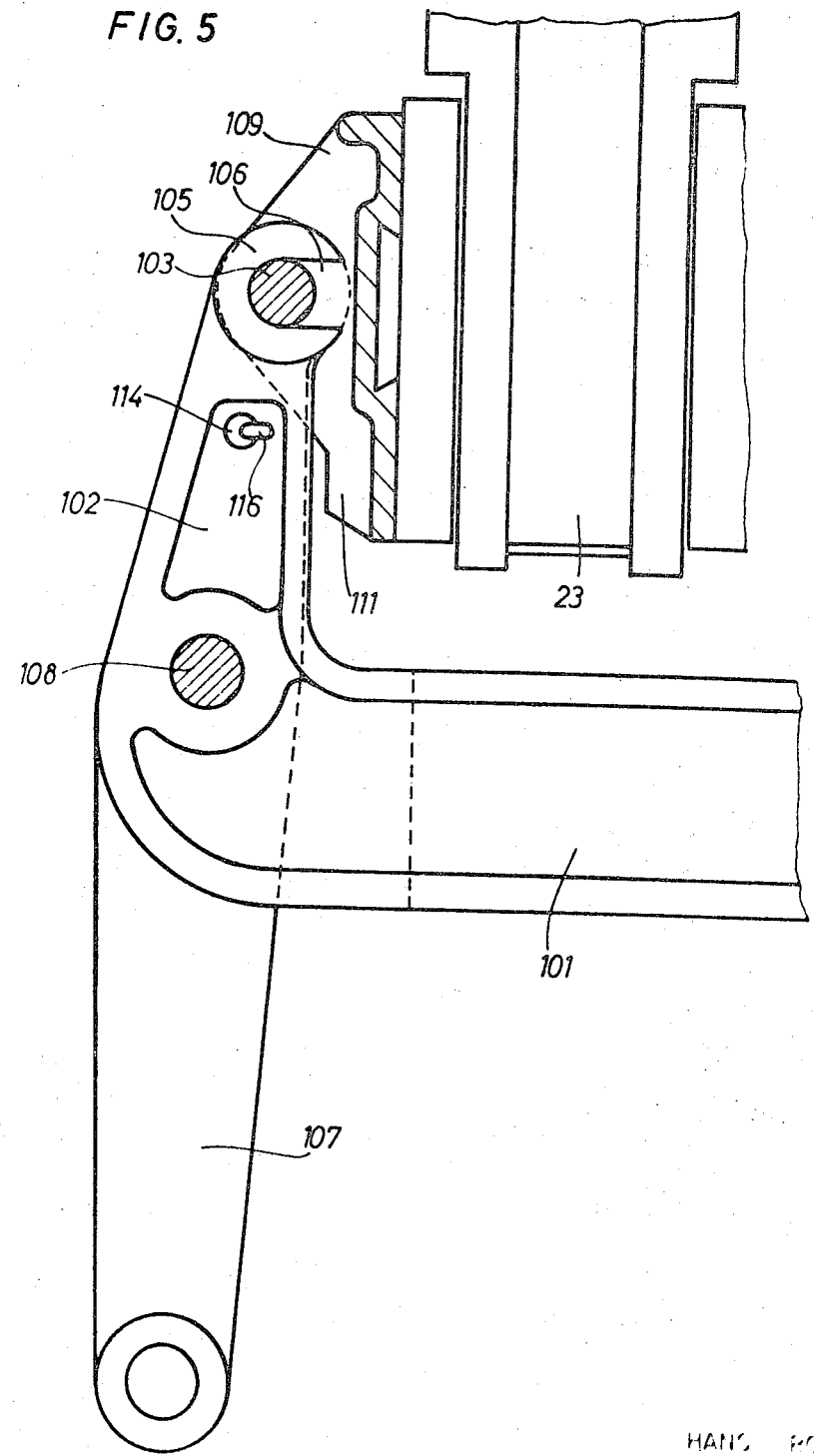

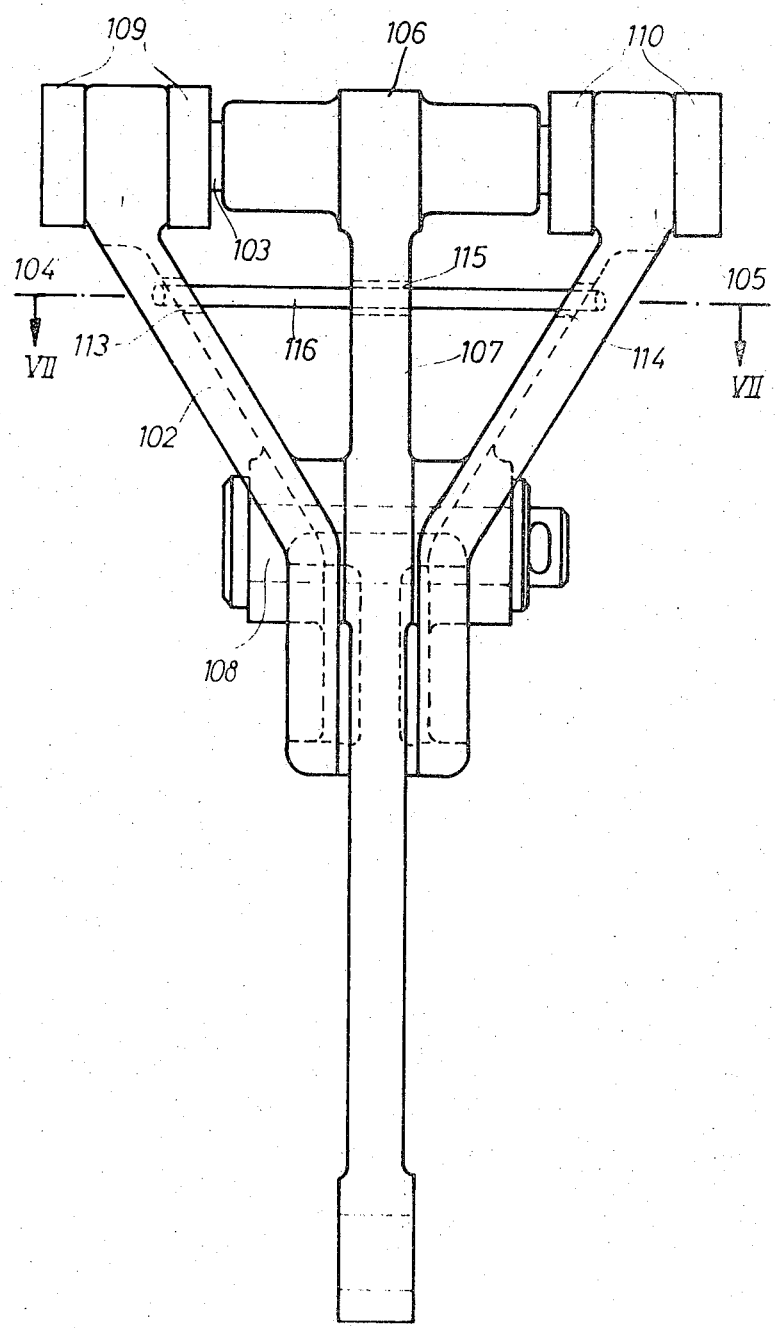

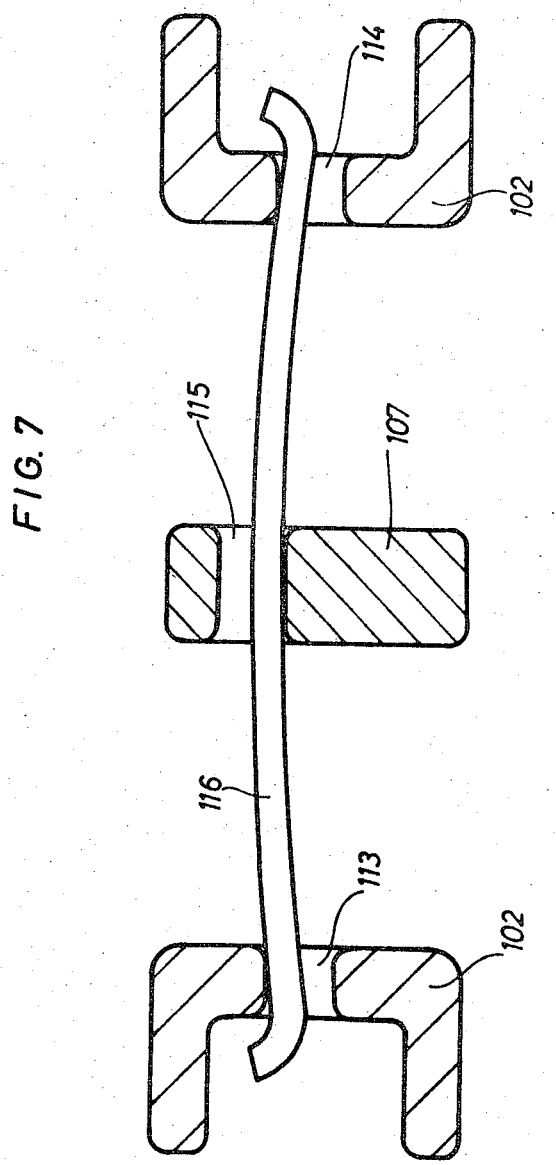

DISK BRAKE FOR RAILWAY VEHICLES

The present invention relates to a disc brake for railway vehicles, more particularly to the structure for actuating such a disc brake where the brake shoes are mounted on the legs of a yoke straddling the peripheral edge of a brake disc Disc brakes as generally used on railway vehicles include one or more brake shoes which are moved into braking engagement with one or both sides of a brake disc mounted on the wheel or axle of a railway vehicle. Many forms of actuating mechanisms for such brakes have been devised. In one such structure a pair of resilient brake levers are moved into braking engagement with opposed faces of a brake disc somewhat in the manner of tongs. A fluid pressure-actuating cylinder moves wedge-shaped pressure member between the free ends of the brake levers to move the brake shoes carried by the other ends of the brake levers into frictional engagement with the brake disc. The free ends of the brake levers are positioned generally radially forwardly of the brake disc and it is thus necessary for the brake levers to be mounted on the vehicle frame forwardly of the brake disc at a substantial distance from the vehicle wheel axle. This arrangement is disadvantageous since a necessary amount of space to accommodate the mechanism forwardly of the brake disc is often not available.

It has therefore been proposed to mount the actuating cylinder on the vehicle frame laterally of the vehicle wheels and to move the wedgelike pressure member between the free ends of the pair of brake levers by means of a lever mounted radially in front of the brake disc. However, this arrangement also required a relatively large amount of space to accommodate a rather elaborate system of braking linkages including several straight and angular levers with their requisite pivotal connections.

In another form of brake disc there is provided a U-shaped yoke which straddles the peripheral edge of a brake disc with one leg of the yoke carrying on its inner face a brake shoe with the other leg slidably supporting an axially movable rod having a brake shoe on its end adjacent the brake disc The actuation of the rod is accomplished by means of an angular lever that is pivotally connected on the yoke and is connected to the other or rear end of the rod. In this arrangement the braking force must be transmitted through this pivotally mounted lever and the several pivotal connections are readily susceptible to considerable wear and to malfunctioning. Because only a limited space is available for bearing connections, the distances from the lever connection on the yoke to the rod upon which force is transmitted must be greater than a certain predetermined length if the desired translation ratio is to be maintained. This would require a relatively long lever arm to be connected to the actuating cylinder which in turn would have to be attached to the vehicle frame by special mounting brackets. Further, the actuating cylinder would have to be located at considerable distance from the brake.

It was therefore proposed that in such a disc brake employing a U-shaped yoke the actuating fluid pressure be applied between a fixed wall in the yoke and a diaphragm which actuates a piston movably mounted in the yoke and connected to a brake shoe. However, this system had the disadvantage that it was impossible to provide any translation of the braking force. A further disadvantage of disc brakes using levers as a translating mechanism is that these mechanisms are not symmetrical and that structurally different brake structures are necessary for the right and left side disc brakes.

It is therefore the principal object of the present invention to provide a novel and improved disc brake for railway vehicles.

It is another object of the present invention to provide a railway vehicle disc brake wherein a U-shaped yoke straddles the peripheral edge of the brake disc with the brake shoes being operated by a fluid pressure-actuating cylinder mounted on the yoke.

It is a further object of the present invention to provide a disc brake for railway vehicles wherein the force exerted by an actuating cylinder may be translated to the brake shoes without levers.

It is still another object of the present invention to provide an extremely compact unitary brake disc unit for railway vehicles which can be used on either side of a brake disc without modification.

According to the present invention, the disc brake for railway vehicles may comprise a U-shaped yoke having two legs straddling the peripheral edge of a brake disc. A brake shoe is mounted on the inner face of one leg and the other leg slidably carries a rod which is axially movable toward and away from the brake disc with such movement being substantially perpendicular to the disc. A second brake shoe is carried on the end of the rod adjacent the brake disc. A brake cylinder is carried by the yoke and has an actuating rod extending therefrom with a wedge member being carried on the end of the actuating rod. The wedge member has an inclined surface which is parallel to a second inclined surface carried on the other end of the rod. Roller means are interposed between the parallel inclined surfaces so that actuation of the brake cylinder will move the actuating rod and the movement of the actuating rod will be translated by means of the inclined surfaces and roller means to the brake shoe rod.

The brake shoe rod is provided with an automatically operable mechanism to compensate for any wear in the brake shoes resulting from repeated braking.

Other objects and advantages of the present invention will be apparent upon reference to the accompanying description when taken in conjunction with the following drawings wherein;

FIG. 5 is a side view of a portion of a disc brake unit according to the present invention utilizing a manually operable brake lever;

FIG. 6 is a front view of the structure illustrated in FIG. 5; and

FIG. 7 is a sectional view taken along the line VII–VII of FIG. 6.

Proceeding next to the drawings wherein like reference symbols indicate the same parts throughout the various views a specific embodiment and modifications of the present invention will be described in detail.

Figure 1:
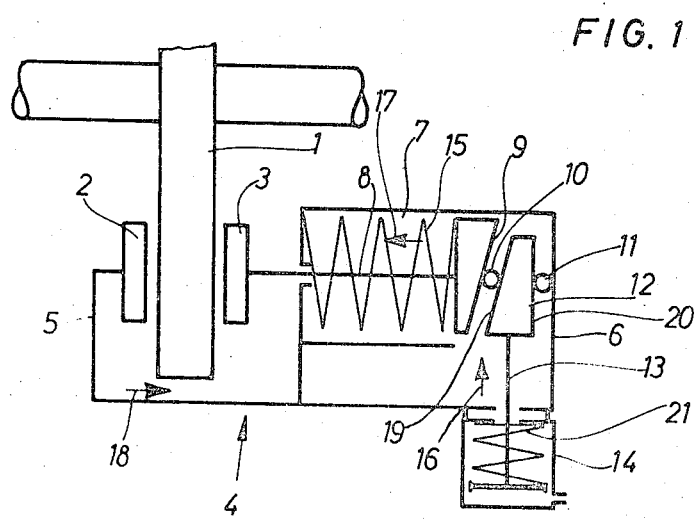
FIG. 1 is a schematic representation of the disc brake unit according to the present invention.

In FIG. 1, there is indicated at 1 a brake disc which is fixedly mounted on an axle or may be mounted to the hub of a wheel of one of the two wheels on an axle. The brake disc is generally provided with a ventilating structure such as cooling ribs. Brake discs may also be mounted on opposite sides of a wheel.

On opposed sides of the brake disc there are mounted brake shoes or friction means 2 and 3. Brake shoe 2 is mounted on the inner face of a leg 5 of a U-shaped yoke 4 having another leg 6 provided with a chamber 7. Slidably carried within chamber 7 is a push rod 8 that is movable axially in a direction which is substantially perpendicular to the brake disc 1. The brake shoe 3 is mounted on the forward end of push rod 8 with the rear end of the rod being attached to a wedge member having an inclined pressure surface 9.

A wedge member 12 is positioned between the inclined pressure surface 9 and a fixed wall of leg 6. The wedge member 12 is mounted on the end of a piston rod 13 of a fluid pressure brake actuating cylinder 14 that is carried by the yoke 4. The wedge member 12 is provided with an inclined face 19 whose height increases in the direction of the brake cylinder 14 with the inclined surface being substantially parallel to the inclined pressure surface 9. The opposite face of the wedge member 20 is parallel to the piston rod 13. A roller 10 is interposed between the parallel inclined surfaces 9 and 19 and, similarly, a roller 11 is positioned between the opposite surface 20 of the wedge member and the fixed rear wall of leg 6 of the yoke. Instead of the rollers, ball bearings mounted in a suitable cage may also be used.

Within chamber 7 there is positioned a spring 15 to urge the inclined pressure surface 9 through roller 10 against the inclined wedge surface 19.

The U-shaped yoke 4 together with the brake cylinder 14 which may be integral therewith is supported from the vehicle frame by any suitable mounting attachment such as by means of hangers attached to brake shoes 2 and 3.

The actuating cylinder 14 is actuated by a suitable fluid pressure which may be either pneumatic or hydraulic. When fluid under pressure is introduced into the actuating cylinder 14, wedge member 12 will be moved by piston rod 13 in the direction of the arrow 16. This movement of the piston rod will be translated through the inclined parallel surfaces 9 and 19 and the roller to the push rod 8 so that this rod will be moved in the direction of the arrow 17 toward the brake disc 1 and against the force of return spring 15. Brake shoe 3 will thus be moved from a disengaged or released position slightly spaced from brake disc 1 into the engaged or braking position with its friction surface engaging the friction surface of brake disc 1. Further movement of wedge member 12 in the direction of the arrow 17 will cause the U-shaped yoke 4 to be shifted in the direction of arrow 18 so that the brake shoe 2 will also be moved from its disengaged or released position into the braking position against brake disc 1.

Upon release of the brakes by exhausting pressure fluid from brake cylinder 14, wedge member 12 will be moved in a direction opposite to that indicated by arrow 16 and under the action of spring 21 will be returned to its original disengaged position. At the same time, return spring 15 will move the pressure surface 9 in a direction opposite to that indicated by arrow 17 so that brake shoe 3 is disengaged from brake disc 1. Because of the pivotal suspension of the U-shaped yoke 4 brake shoe 2 will also return to its original or disengaged position.

Figure 3:
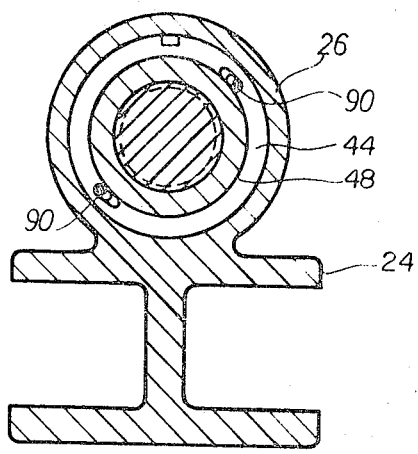
FIG. 3 is a sectional view taken along the line III–III of FIG. 2.
Figure 4:
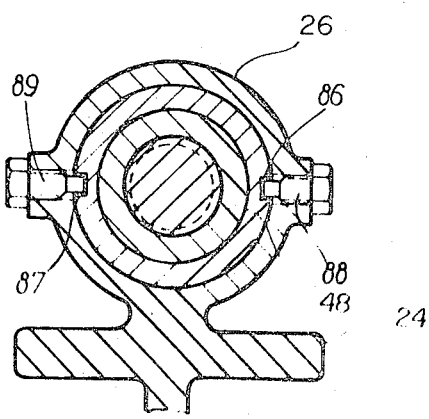
FIG. 4 is a sectional view taken along the line IV–IV of FIG. 2.
Figure 2:
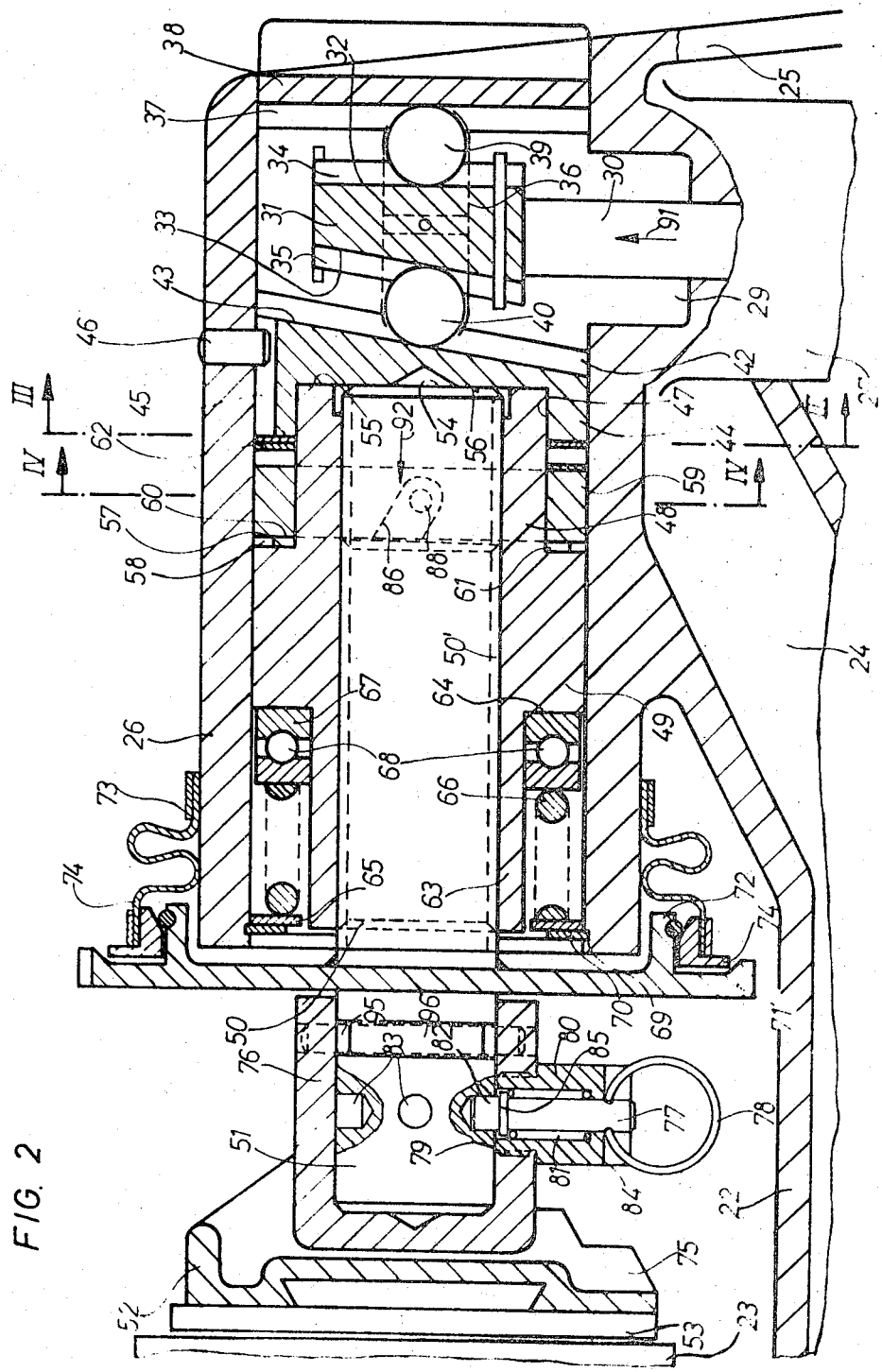
FIG. 2 is a sectional view taken along the longitudinal axis of the brake shoe rod of a disc brake according to the present invention provided with an automatic mechanism to compensate for brake shoe wear.

Proceeding next to FIGS. 2—4 there is illustrated in detail a preferred construction of the right-hand half of the U-shaped yoke 4 which is shown schematically in FIG. 1. In FIG. 2, the yoke is indicated at 22 and has an I-shaped cross section and has only a small space in a radial direction from the peripheral edge of brake disc 23. The yoke 22 is thus substantially parallel to the rotational axis of the brake disc 23. As viewed in FIG. 2, the right-hand portion of yoke 22 has an S-shaped curved yoke portion 24 in the direction of the rotary axis of the brake disc and at its end 25 carries a cylindrical sleeve 26 which extends in an axial direction toward the brake disc. Also at end 25 of the yoke portion 24 there is rigidly mounted an actuating cylinder 27 only a portion of which is indicated. Through an opening 29 there is slidably positioned a piston rod 30 extending outwardly from actuating cylinder 27 into the rearward portion of the cylindrical sleeve 26. A wedge-shaped pressure member 31 is mounted on the free end of piston rod 30 and is provided with a surface 32 which is parallel to the axis of piston rod 30 and on its opposite face with an inclined surface 33 which rises in the direction of actuating cylinder 27. Both surfaces 32 and 33 are provided with longitudinal grooves 34 and 35 respectively in which there are seated ball bearings 39 and 40 both of which are retained in a cage indicated at 36. Ball 39 is also supported in a longitudinally extending groove 37 formed in a pressure plate 38 which is rigidly secured at the rear end of cylindrical sleeve 26.

The other ball 40 is similarly supported in a longitudinal groove 42 formed in an inclined surface 43 of a pressure member 44. The inclined surfaces 33 and 43 with ball 40 interposed therebetween and the surfaces 32 and 38 with the ball 39 interposed therebetween will always remain parallel to each other.

The pressure member 44 is ring-shaped and is axially movable within the cylindrical sleeve 26. On the outer peripheral surface of pressure member 44 there is a longitudinally extending groove 45 which receives a pin 46 fixedly mounted in sleeve 26. In the face of the pressure member away from inclined surface 43 there is an axial bore 47 which receives a rearward tubular extension 48 of a nut 49 provided with internal screw threads at 50' only in its forward portion and which is axially movable within the cylindrical sleeve 26. A spindle or rod 50 is screwed into the threaded portion 50' of nut 49 and has its forward end 51 projecting outwardly of the cylindrical sleeve 26. On the rod end 51 there is mounted a brake head 52 having a brake shoe 53 thereon.

The end of tubular extension 48 of nut 49 is indicated at 55 and engages bottom surface 56 of pressure member axial bore 47. Between the extension 48 from nut 49 and the pressure member 44 there is provided a unidirectional coupling 90 (shown in FIG. 3) which includes a spring-biased ball seated in an inclined groove in such a manner that relative rotation between pressure member 44 and the nut 49 can occur in only one direction. An annular spring 62 is positioned in front of the pressure member 44 and prevents the ball and spring of the coupling 90 from dropping out.

Nut 49 has a rearwardly facing shoulder 57 upon which there are provided ratchet teeth 58. An axially movable ring 59 is rotatably mounted on the nut extension 48 so as to be positioned between the pressure member 44 and the rearwardly facing shoulder 57 of the nut. On the forward face 60 of ring 59 there are provided ratchet teeth 61 which mesh with ratchet teeth 58 on the nut 49. Annular spring 62 which is positioned between the pressure member 44 and the ring 59 urges ring ratchet teeth 61 into meshing engagement with nut ratchet teeth 58.

On the outer peripheral surface of the ring 59 there are formed two diametrically opposed inclined grooves 86 and 87 as may be seen in FIG. 4. These grooves receive the inner ends of pins 88 and 89 that are screwed into the wall cylindrical sleeve 26 as shown in FIG. 4. The diameters of pins 88 and 89 are considerably less that the width of the grooves 86 and 87 so that ring 59 is free for limited axial movement but when moved over a longer axial distance will be rotated by the interaction of the pins 88 and 89 with their respective grooves 86 and 87.

The forward end of nut 49 is provided with another tubular extension 63 around which there is formed a shoulder 64 against which is seated a thrust bearing 67 having balls 68. A compression spring 66 is interposed between the ball bearing 67 and a washer 65 retained in position by means of a split ring 70 seated in an annular groove 69 formed in the forward end of cylindrical sleeve 26. Forwardly of the cylindrical sleeve 26 a hand wheel 71 is fixedly secured to the spindle or rod 50. The hand wheel is provided with a rearwardly extending flange 72 which encircles the forward end of sleeve 26. The junction between the forward end of cylindrical sleeve 26 and the hand wheel flange 72 is enclosed by a protective flexible bellows 74' one end of which is held on the outer surface of sleeve 26 by a ring 73 and its other end similarly secured to a ring 74 rotatably seated on the outer periphery of flange 72.

The brake head 52 is mounted by ribs or fins 75 to a cylindrical cap 76 which fits over the front end 51 of rod 50. 76 is provided with a threaded hole 79 in which there is screwed a nipple 80 having an axial bore 81 in which there is slidably mounted a detent or latching bolt 77 having a pull ring 78. At the forward end of latching bolt 77 there is formed a shoulder 85 against which a force is exerted by a spring 84 seated in bore 81. The inner end of bolt 77 is engageable with any one of four recesses 83 circumferentially spaced around the periphery of rod end portion 51. The cap 76 is rotatably supported on the end of rod 50 but retained against axial movement by means of a bolt 96 extending transversely through the cap 76 and received in a peripheral groove 95 formed in the rod 50.

The structure as described above functions to automatically compensate for wear in the brake shoe 53. Regardless of wear in the brake shoe 53 resulting from repeated braking operations the brake shoe will be positioned at the same distance from the brake disc when in the disengaged position. This brake shoe resetting or compensating mechanism will operate as follows:

Actuation of braking cylinder 27 will cause piston rod 30 to move in the direction of arrow 91. By the interaction of ball 40 between the inclined surfaces 33 and 43 pressure member 44 will be moved axially in the direction of arrow 92. The translation ratio of the movement of pressure piece 44 with respect to piston rod 30 will depend on the angle of inclination of wedge member surface 33. Axial movement of pressure member 44 will then move nut 49 with its rod 50 and ring 59 a corresponding distance. Pressure spring 66 will be compressed through the same axial distance. For overcoming the necessary play between brake shoe 53 and brake disc 23, the ring 59 is first moved in the direction of arrow 92 a distance less than the normal braking movement until the ends of pins 88 and 89 engage the walls of guide grooves 86 and 87. If, after this movement, the brake shoes are still not in braking position against the brake disc then further axial movement of pressure piece 49 in the direction of the arrow 92 will cause rotation of ring 59 by the interaction of the inclined guide grooves 86 and 87 with their respective pins 88 and 89. As ring 59 rotates, its ratchet teeth 61 will move over the ratchet teeth 58 of nut 49 corresponding to the resetting of the brake shoes. During this time, coupling 90 retains nut 49 against rotation in this direction and as annular spring 62 compresses and ring 59 moves axially away from nut 49 the ratchet teeth 58 and 61 will be disengaged.

When the brake is disengaged, piston rod 30 will be moved in a direction opposite to arrow 91 and spindle 50 will be moved back in the axial direction opposite to arrow 92 under the action of the compressed spring 66. The axial movement of spindle 50 will be through a distance equal to the free play of the brake shoe until the ends of pins 88 and 89 engage the opposite sides of guide grooves 86 and 87. Ring 59 will then be rotated back to the previously selected resetting distance whereby the ratchet teeth will again mesh so that nut 49 will rotate with ring 59 while the coupling 90 is disengaged during rotation in this direction. In this manner, the nut 49 is rotated with respect to the spindle 50 through a resetting distance which was automatically selected by the rotation of ring 59 at the beginning of the braking action. The spindle 50 will then be screwed outwardly with respect to nut 49 a sufficient distance so as to automatically maintain a predetermined amount of play of the brake shoe independently of the application of the brakes. Thus the play or distance the brake shoe must move before braking action commences will always be the same.

When the brake shoes are replaced the desired play between the brake shoe and brake disc can be adjusted by use of hand wheel 71. The latching bolt 77 is disengaged from one of the recesses 83 and the threaded spindle then adjusted within nut 49 by rotation of the hand wheel 71 to set the desired distance between the brake shoe and brake disc. After this adjustment is completed, the latch bolt 77 is permitted to engage one of the recesses 83 under the action of spring 84.

Proceeding next to FIGS. 5—7, there is shown a modification of the disc brake of the present invention wherein the left side of the U-shaped yoke as viewed in FIG. 1 is modified to accommodate a manually operated braking lever. The yoke is indicated at 101 with its left leg 102 being forked as best shown in FIG. 6. The upper ends of the fork legs 102 are provided with recesses 104 and 105 opening toward brake disc 23 to receive a transverse bolt 103. Between the bearing recesses 104 and 105, bolt 103 carries a knuckle 106 to which is attached a manually operated brake lever 107 which is pivotally mounted on yoke 103 at 108. At both sides of the bearing recesses 104 and 105, the bolt 103 carries bearing lugs 109 and 110 extending from the outer face of the brake head 111. The inner face of brake head 111 adjacent brake disc 23 is provided with a brake shoe.

The forked legs 102 are provided with openings 113 and 114 and the brake lever 107 is provided with an opening 115 with a spring bar 116 extending through these openings. The spring bar 116 urges brake lever 107 in a counterclockwise direction as seen in FIG. 5 to maintain transverse bolt 103 seated within the bearing recesses 104 and 105. When the lower end of brake lever 107 is moved to the left as viewed in FIG. 5 by manual actuation of the brake linkage mechanism, the brake head 111 and the brake shoe will be moved to the right into braking engagement with brake disc 23. At the same time, bolt 103 will be moved slightly outwardly with respect to recesses 104 and 105 against the force of spring bar 116 and yoke 101 will be moved to the left by the pivot bearing 108.

It is apparent that the braking unit illustrated in FIG. 1 is bilaterally symmetrical and can be used as a left-hand or right-hand braking unit. In FIG. 1, the braking unit is shown in the right-hand position and to convert the unit into a left hand unit it is only necessary to turn yoke 4 around in the opposite direction and to transpose the suspension members for connecting similarly shaped brake shoes 2 and 3 to the vehicle frame.

Thus it can be seen that the present invention has disclosed a disc brake which is compact in structure and is bilaterally symmetrical. Further the disc-braking unit disclosed herein occupies a minimum of space underneath the vehicle with a major portion of the brake unit being positioned laterally of the brake disc. The braking unit may be provided with an automatically operable mechanism to compensate for wear in the brake shoes so that the free play between the brake shoes in the disengaged position and the brake disc remains constant after repeated braking operations. The left-hand end of the yoke as viewed in FIG. 1 may also be modified to accommodate a manually operable braking lever.

It will be understood that this invention is subject to modification in order to adapt it to different uses and conditions and, accordingly, it is desired to comprehend such modification within this invention as may fall within the scope of the appended claims.

We claim:

1. In a disc brake for railway vehicles, a U-shaped yoke having two legs straddling the peripheral edge of a brake disc, a brake shoe on the inner face of one leg, a push rod slidably carried by the other leg of said yoke and axially moveable toward and away from said brake disc, a second brake shoe on the end of said push rod adjacent said brake disc, means carried by and acting upon said push rod for automatically compensating for brake shoe wear, a brake cylinder on said yoke and having a piston rod extending therefrom, a wedge member on said piston rod and having an inclined surface and a second surface opposed therefrom, an inclined surface on the other end of said push rod and parallel to said wedge member inclined surface, and roller means between said inclined surfaces and between said wedge member opposed surface and the other leg of the yoke whereby actuation of said brake cylinder will move said piston rod and the movement of the piston rod will be translated through said inclined surfaces and roller means to the brake shoe push rod.

2. In a disc brake for railway vehicles as claimed in claim 1 with said wedge member surface opposed from its inclined surface being parallel to said piston rod.

3. In a disc brake for railway vehicles as claimed in claim 1 with said yoke one leg being bifurcated and having recesses in the bifurcated ends opening toward the brake disc a bolt seated within said recesses with the brake shoe being mounted upon said bolt, and a manually operated braking lever pivotally mounted on the yoke and having its upper end pivotally connected to said bolt.

4. In a disc brake for railway vehicles as claimed in claim 1 with said push rod being threaded, a nut threaded upon said push rod and having a tubular extension surrounding said rod, there being ratchet teeth on said nut surrounding said extension, a ring rotatably mounted on said nut tubular extension and having ratchet teeth thereon meshing with said nut ratchet teeth so that said ring is rotatable in one direction with respect to said nut, there being inclined guide grooves in the peripheral surface of said ring, and stationary pins projecting into said guide grooves and loosely received therein so that said ring is axially moveable a distance substantially equal to the distance moved by the brake shoe before engaging the brake disc, said ring being rotatable in one direction with respect to said nut a predetermined distance upon actuation of the brake and rotatable in the opposite direction together with the nut when the brake is released.

5. In a disc brake for railway vehicles as claimed in claim 4 and comprising unidirectional slip clutch means engaging said nut to prevent rotation of said nut in a direction to unscrew the nut with respect to said push rod.

6. In a disc brake for railway vehicles as claimed in claim 4 and comprising a hand wheel mounted on said rod for rotating manually said push rod.

7. In a disc brake for railway vehicles as claimed in claim 4 with said second brake shoe being rotatably mounted on the end of said push rod.

8. In a disc brake for railway vehicles as claimed in claim 7 with said second brake shoe having a cap rotatably mounted on the end of said push rod, and selectively operable detent means on said cap engageable with said push rod for non-rotatably retaining said cap thereon in a predetermined position.

9. In a disc brake for railway vehicles as claimed in claim 8 and comprising means on said cap for retaining said cap against axial movement on said rod while permitting rotary movement thereon.